United States Patent [19]

Dyer et al.

[11] Patent Number: 4,522,035
[45] Date of Patent: Jun. 11, 1985

[54] METHOD AND APPARATUS FOR RECOVERING WASTE ENERGY

[75] Inventors: David Dyer, Auburn, Ala.; James L. Wise, Depere, Wis.

[73] Assignee: TechMark Corporation, Newport, R.I.

[21] Appl. No.: 558,014

[22] Filed: Dec. 5, 1983

Related U.S. Application Data

[63] Continuation of Ser. No. 227,774, Jan. 23, 1981, Pat. No. 4,437,316.

[51] Int. Cl.³ .............................................. F25B 7/00
[52] U.S. Cl. ....................................... 62/79; 62/332; 62/510; 165/62
[58] Field of Search ............................ 62/332, 510, 79; 165/62

[56] References Cited

U.S. PATENT DOCUMENTS

| | | | |
|---|---|---|---|
| 2,548,508 | 4/1951 | Wolfner | 62/332 X |
| 3,212,276 | 10/1965 | Eld et al. | 62/510 X |
| 4,041,724 | 8/1977 | Gustafsson | 62/79 X |
| 4,173,125 | 11/1979 | Bradshaw | 62/79 |
| 4,226,089 | 10/1980 | Barrow | 62/79 X |

*Primary Examiner*—Lloyd L. King
*Attorney, Agent, or Firm*—Louis Weinstein

[57] ABSTRACT

Method and apparatus for recovery of waste heat from thermomechanical pulping systems and the like in which waste heat in the form of steam exhausted from the mechanical pulper and latency chest portions of the thermomechanical pulping system are respectively passed through first and second evaporators which increase the enthalpy of the working liquid. The working fluid outputted from the first evaporator passes through a first compressor to significantly increase both pressure and temperature and further increase enthalpy. The working fluid at the outlet of the first compressor then undergoes desuperheating within an intercooling tank. The liquid phase of the working fluid is passed from said tank to the inputs of both evaporators, while the vapor phase merges with the working fluid outputted from the second evaporator and enters a second compressor to undergo further increases in pressure and temperature. The working fluid emerges from the second compressor and is passed through a condenser where it transfers its heat energy to water passing through the condenser, which water is converted to steam at a pressure well in excess of atmospheric. The working liquid, in giving up its heat energy, is converted into the liquid phase and is passed to the intercooling tank which serves as a means to balance differences in the mass flow rate, temperature, pressure and enthalpy of the working fluids respectively passing through the first and second compressors, thereby allowing the first and second compressors to operate at different temperature and pressure levels although they are driven by a common prime mover. The waste heat recovery system produces extremely useful high pressure, high temperature steam, free of the impurities present in the steam vented by the thermal mechanical pulping system. One of the above-mentioned evaporators may be omitted in applications where waste energy is derived from a single source. The system may be used in conjunction with other systems developing high waste energy such as dryer systems. Other techniques are employed to further enhance the coefficient of performance of the system.

8 Claims, 10 Drawing Figures

METHOD AND APPARATUS FOR RECOVERING WASTE ENERGY

This is a continuation of application Ser. No. 227,774, filed Jan. 23, 1981, now U.S. Pat. No. 4,437,316.

FIELD OF THE INVENTION

The present invention relates to waste energy recovery systems and more particularly, systems employing a working fluid for converting the waste energy developed for use in a manufacturing process, and otherwise vented to the atmosphere after being used, into usable energy, preferably in the form of steam at a temperature and pressure not heretofore possible through the use of conventional techniques.

BACKGROUND OF THE INVENTION

Many large scale manufacturing facilities generate extremely large quantities of waste energy, typically in the form of heat, during the performance of their manufacturing operations. This waste energy is completely lost after use and, in fact, is conventionally vented directly to the atmosphere. Attempts at energy recovery through available techniques are either highly inefficient or so costly as to prohibitively exceed the savings which might result therefrom due to the energy recovered.

One of the best examples of the above situation exists in the pulp and paper industry in which huge equipment installations, which necessitate the use of extremely large amounts of energy, are required to produce tons of pulp and paper on a daily basis. Equipment of this nature must also be capable of operating continuously and with very little down time. For example, systems such as thermomechanical pulping (TMP) and chemimechanical pulping (CMP) systems require extremely large quantities of electrical energy to operate motors having ratings in the thousands of horsepower range for the purpose of grinding wood chips to a fine pulp at an output rate of more than 100 tons per day, for example. Extremely large quantities of waste energy are generated as a result of the conversion of the electrical power driving the motors, which electrical power is converted to mechanical work and subsequently to thermal energy in the form of steam. Steam is passed through a tube containing the wood chips prior to their entry into a primary refiner to soften the chips and thereby facilitate the refining operation.

The chips are typically defibered between a pair of huge counter-rotating discs. The heat generated during the refining operation, which is performed in a confined region, is vented to the atmosphere through an exhaust conduit. Although some efforts have been developed to recycle small portions of the vented steam to the aforementioned steaming tube in which the chips are initially heated and softened, the vast majority of the heat energy is unrecoverable and hence is lost.

BRIEF DESCRIPTION OF THE INVENTION

The present invention is characterized by comprising method and apparatus for waste energy recovery through the use of a working fluid which derives heat energy from the waste energy typically exhausted from a facility upon completion of a manufacturing process step. The energy level of the working fluid is further increased by undergoing compression. The energy of the working fluid is then utilized to develop steam at a temperature and pressure which make the steam extremely advantageous for use in a wide variety of applications.

Waste energy from two different locations in the mechanical process apparatus and available at the same or different energy levels, is utilized to increase the energy of the aforesaid working fluid through the use of separate independent evaporators. The working fluid passes from one evaporator to a first compressor and then to an intercooling tank, also known as a desuperheater, for desuperheating the working fluid. The working fluid from the second evaporator passes directly to a second compressor. The working fluid from the output of the condenser passes to the intercooling tank. The intercooling tank desuperheats the working fluid (which is in the form of a superheated vapor) entering the intercooling device and automatically adjusts the level control between the liquid/vapor phases therein, enabling the first and second compressors, which operate under control of a common prime mover, to operate at significantly different temperature and pressure levels and to accommodate different mass flow rates of the working fluid.

The technique described above totally isolates the three major constituents of the system, namely the waste energy input, the intermediary working fluid and the steam produced thereby, to provide an output of uncontaminated energy in the form of steam at temperatures and pressures not heretofore capable of being obtained through conventional recovery techniques.

The working fluid is capable of absorbing energy at high operating temperatures which causes breakdown components. However, these components occur in such small amounts as to avoid any deleterious effects upon the system components and operating efficiency.

The above technique may be used to recover waste energy from a single waste energy source by omitting one of the aforementioned evaporators. Typically, a compressor is used for each evaporator and a compressor may be eliminated for each evaporator eliminated. Alternatively, multiple compressors may be utilized in order to achieve working fluid pressure levels above the capability of a single compressor.

The techniques described above may be used to recover waste energy developed by a variety of industrial systems. As another embodiment of the present invention, waste energy in the form of heated air emitted from a paper dryer system is utilized, together with another working fluid, to generate steam.

Other novel techniques for improving the coefficient of performance are employed, such as: pressure reducing means for generating power for independent use; a multiple array of heat exchangers and working fluid (refrigerant) loops to alter the output energy levels relative to the waste energy input; regulating the introduction of waste energy input; regulating the introduction of make-up steam with waste steam to maintain the characteristics of the output of the system constant; regulating, removing and replenishing the working fluid (i.e. refrigerant) from a working fluid (refrigerant) loop in accordance with its rate of decomposition during use; and providing means in the heat exchangers for subcooling the working fluid (refrigerant).

OBJECTS OF THE INVENTION AND BRIEF DESCRIPTION OF THE FIGURES

It is, therefore, one object of the present invention to provide novel method and apparatus for waste energy recovery to produce energy, either for reuse in the manufacturing facility producing the waste energy, or for use in other applications, or both.

Another object of the present invention is to provide novel method and apparatus for recovery of waste energy in which the energy from the source producing the waste energy is transferred to an output working fluid through the advent of an intermediate working fluid.

Still another object of the present invention is to provide a novel method and apparatus for recovery of waste energy obtained from thermomechanical pulping systems and the like and through the intermediary of a working fluid, which transfers the waste energy at high efficiency to an output working fluid.

Still another object of the present invention is to provide a novel method and apparatus for recovery of waste energy obtained from thermomechanical pulping systems and the like and through the intermediary of a working fluid, which transfers the waste energy at high efficiency to an output working fluid.

Still another object of the present invention is to provide a novel method and apparatus for recovery of waste energy from thermomechanical pulping systems and the like in which energy in the form of heat is transferred to an output working fluid by way of an intermediate working fluid, the input energy, intermediate working fluid and output working fluid being physically isolated from one another.

Still another object of the present invention is to provide a novel method and apparatus for recovery of waste energy derived from two or more sources and utilizing intercooling tank means arranged between a pair of driven compressor means enabling the working fluid passing through said compressor means to be operated at significantly different temperature and pressure levels.

The above, as well as other objects of the present invention, will become apparent when reading the accompanying description and drawings in which.

DETAILED DESCRIPTION OF THE INVENTION

Figure 1:
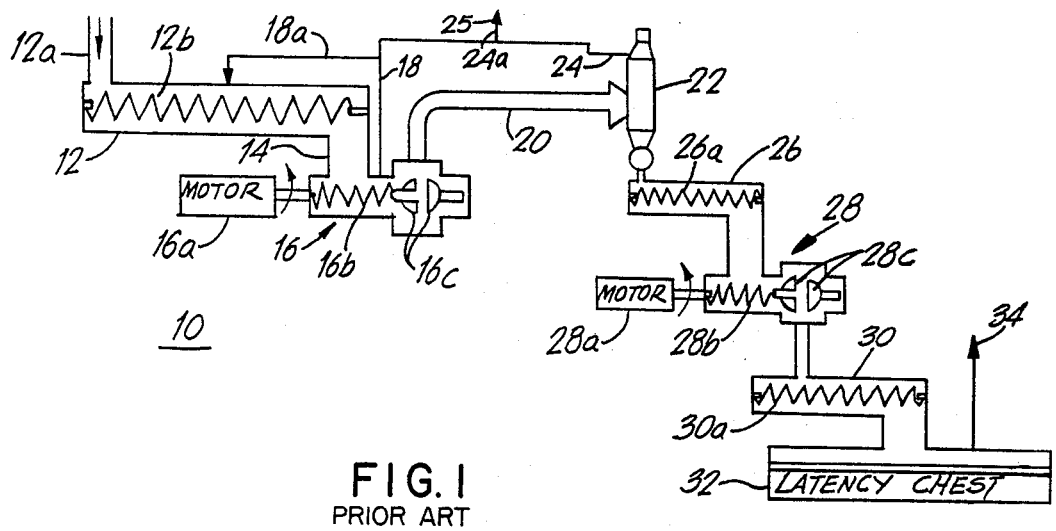
FIG. 1 shows a simplified diagram of a source of waste heat energy in the form of a thermomechanical pulping system.

As was mentioned hereinabove, the present invention is extremely advantageous for use in the recovery of waste energy, especially from systems generating tremendous quantities of waste energy. One such system is the thermomechanical pulping system 10 shown in FIG. 1 and comprising a steaming tube 12 having an inlet 12a receiving wood chips which usually have preferably been screened to eliminate chips larger than a predetermined size; and which chips have been subjected to a waterbath to remove foreign materials, such as sand. The chips enter into the steaming tube 12, containing steam at a pressure in excess of atmospheric, for the purpose of heating and softening the chips.

The chips are exposed to steam for a short period of time, usually less than several minutes, and are advanced by screw feeder 12b through intermediate conduit 14 to primary refiner 16. The primary refiner is typically comprised of an electric drive motor 16a having a rating of the order of one thousand to the order of ten thousand horsepower, which motor 16a is utilized to provide relative motion between a pair of grinding discs 16c for grinding and defiberizing the chips to a predetermined fineness. Screw feeder 16b feeds the chips to the region between the pair of discs 16c to undergo grinding, which operation generates a tremendous amount of heat. The grinding operation takes place within a closed region, causing the generation of steam at a pressure level well above atmospheric. The steam is vented to the atmosphere through exhaust 18. A portion of the steam otherwise vented to the atmosphere is diverted through conduit 18a to steaming tube 12 and eliminates the need for any makeup steam once the system 10 reaches steady operation.

The defiberized chips are then transferred through conduit 20 to blow cyclone 22, which comprises a substantially conical shaped member (not shown for purposes of simplicity). The defiberized chips and steam enter along a line which is tangent to the tapered walls of the conical shaped member, causing the steam and defiberized chips to rotate at a high velocity so as to impart a centrifugal force to the heavier material (the defiberized wood chips), allowing the lighter mass material (the steam) to be vented to the atmosphere through duct 24. Ducts 18 and 24 merge at 24a. Waste energy is vented at 25 in the form of steam at greater than atmospheric pressure. The heavier matter in blow cyclone 22 separates from the lighter matter due to the centrifugal forces and subsequently passes downwardly along the aforementioned conical shaped member and through conduit 26 to a secondary refiner 28, which may, for example, be similar to primary refiner 12. Screw feeder 26a feeds the defiberized chips from blow cyclone 22 along conduit 26. After undergoing still further refining at refiner 28, the resulting pulp passes through conduit 30 to latency chest 32 which temporarily stores the wood pulp preparatory to further processing. Steam at approximately atmospheric pressure is vented to the atmosphere from outlet 34 of latency chest 32. Exhaust steam at greater than atmospheric pressure is available at outlets 18 and 24 (combined at 25) while steam mixed with air at atmospheric pressure is available at outlet 34. Refiner 28 is basically the same in design and operation as refiner 16, and is comprised of motor 28a, screw feeder 28b and grinding discs 28c. Screw feeder 30a moves the pulp from refiner 28 to latency chest 32.

Figure 2:
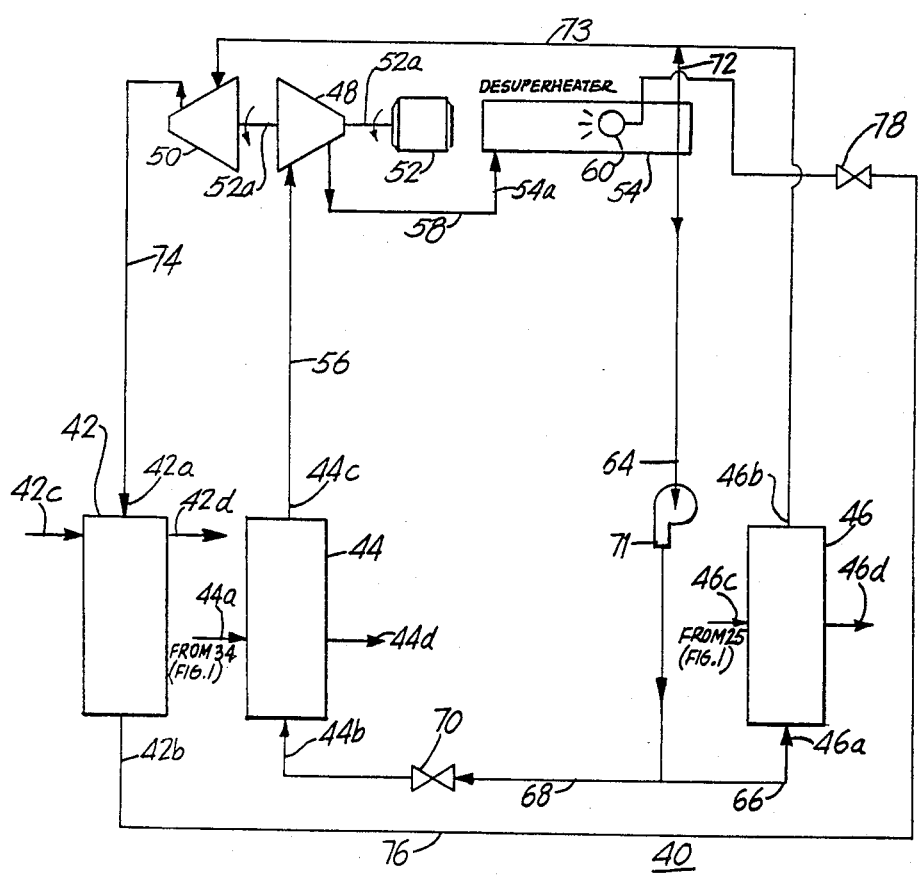
FIG. 2 shows a simplified block diagram of a waste heat recovery system embodying the principles of the present invention.

FIG. 2 shows a simplified block diagram of a waste energy recovery system 40, embodying the principles of the present invention and comprising condenser 42, evaporators 44 and 46, compressors 48 and 50, operated by a common prime mover 52, and intercooling tank 54. Dirty, lower pressure steam mixed with air and derived from the vent 34 of latency chest 32, enters evaporator 44 at an inlet 44a and passes over the energy transfer members (not shown) carrying the working fluid of the system, which working fluid passes over the energy transfer members, such as coils (not shown) of the evaporator 44 at inlet 44b and leaves the coils of evaporator 44 and moves from outlet 44c through conduit 56 to the input of the first compressor 48. The output of compressor 48 passes through conduit 58 to the vapor inlet 54a of desuperheater 54. The working fluid, which may, for example, be a refrigerant in the form of superheated vapor, enters into the portion of desuperheater 54 containing the liquid phase of the working fluid which serves to desuperheat the vapor phase of the working fluid for a purpose to be more fully described. Control means 60 injects working fluid (refrigerant) in the liquid phase into desuperheater 54 to partially desuperheat the vapor in tank 54 while evaporating the additional working fluid in the liquid phase.

The liquid phase of the working fluid passes through conduit 64. A portion of the liquid phase of the working fluid moving through conduit 64 passes through conduit 66 and enters inlet 46a of a falling film evaporator 46. The remaining portion of the working fluid in the liquid phase moves through conduit 68 and adjustable expansion valve 70, which valve reduces the pressure of the working fluid as it passes through valve 70 and enters the inlet 44b of evaporator 44.

Evaporator 46 is similar to evaporator 44 and is provided with energy transfer surfaces (not shown for purposes of simplicity) one of which surfaces the working fluid passes over in moving from the inlet 46a to the outlet 46b of evaporator 46. Waste steam derived from vent 25, for example, enters evaporator 46 at 46c and passes over the aforementioned surfaces, leaves evaporator 46 at oulet 46d. The outlet 46b of evaporator 46 is coupled to the input of the second compressor 50 through conduit 73. The vapor phase of the working fluid within intercooling tank 54 passes through conduit 72 and merges with the working fluid passing through conduit 73 after being emitted from evaporator 46. The working fluid emerges from compressor 50 and passes through conduit 74 to the inlet of condenser 42.

The operation of the heat recovery system in FIG. 2 is as follows:

The working fluid has its pressure reduced by expansion valve 70 causing the working fluid to enter into the liquid/gas phase as it enters into evaporator 44. Low pressure steam mixed with air and derived from the thermomechanical pulper (TMP) latency chest 34 (see vent 34, FIG. 1) transfers its energy (in the form of heat) to the working fluid. The temperature and pressure of the working fluid remain substantially constant at the inlet and outlet end of evaporator 44. However, the enthalpy of the working fluid is significantly increased because of a phase change.

The working fluid undergoes a first stage of compression by passing through a compressor 48 which significantly increases the temperature and pressure of the working fluid while causing only a mild increase in its enthalpy. The superheated working fluid then enters into intercooling tank 54 where it is desuperheated. The pressure of the working fluid is maintained substantially constant as it moves between the outlet end of the first compressor 48 and the inlet end of the second compresser 50 through desuperheater 54, while undergoing a reduction in temperature and enthalpy. The second compressor 50 significantly increases the temperature and pressure of the working fluid derived from desuperheater 54 and evaporator 46 and delivers the working fluid to condenser 42. The working fluid transfers its energy to hot water entering inlet 42c, which hot water is derived from either a fresh water source or from a condensate return provided in the system (not shown) where the clean steam is being utilized. The temperature and pressure of the hot fresh water passing through condenser 42 is maintained substantially constant. However, the enthalpy of the water is increased significantly. The steam generated as a result of the condensation of the working fluid as it passes through condenser 42, may be used in any one of a wide variety of applications, such as paper dryer drums and paper dryer hoods, for example, as well as any other applications requiring steam at pressures of the order of 50 PSIA, or greater.

The working fluid leaving condenser 42 which is now in the liquid phase, passes from conduit 76 through expansion valve 78 which reduces the pressure of the working fluid. The working fluid, in the liquid phase, enters tank 54 through control means 60 to desuperheat the working fluid in the vapor phase, which cooperates to evaporate the additional working fluid introduced into tank 54 through control means 60.

The intercooling tank 54 enables compressors 48 and 50, which are commonly driven by prime mover 52, to operate on working fluids having different temperature and pressure levels without causing unbalanced conditions within the system. Compressors 48 and 50 may also be driven by separate prime movers without altering the advantages of the invention. This technique allows the mass flow rates of compressers 48 and 50 to be significantly different for the purpose of enabling evaporators 44 and 46 to handle waste energy from sources whose temperature and pressure levels are significantly different from one another. In addition, the waste energy recovery utilizes a working fluid capable of operating at temperatures well above 260° F. and up to maximum operating temperatures over 400° F. without experiencing any significant breakdown, thereby enabling the conversion of waste energy into steam at pressure levels and operating efficiencies not heretofore obtainable through conventional techniques. The waste energy sources may be coupled to different evaporators from those designated above, if desired, without departing from the scope of the present invention.

The arrangement of FIG. 2 may be modified to accommodate applications in which waste energy is derived from a single source, by omitting evaporator 46 and diverting all of the working fluid in the liquid phase derived from intercooling device 54, to conduit 68 and hence to evaporator 44. The evaporator 44, compressor 48 and intercooling device 54 may be adjusted to accommodate the particular type of waste energy received by evaporator 44.

Other modifications may be introduced into the embodiment of FIG. 2. For example, it is preferred that the desuperheater 54 be positioned relative to evaporator 46 so that the liquid level in evaporator 46 is at a greater height than the liquid level in the desuperheater 54 to provide the necessary pressure levels. As another alternative, a pump 71 may be placed in conduit 64 to provide and maintain the necessary pressure differential between the liquids in evaporator 46 and desuperheater 54.

Figure 2A:
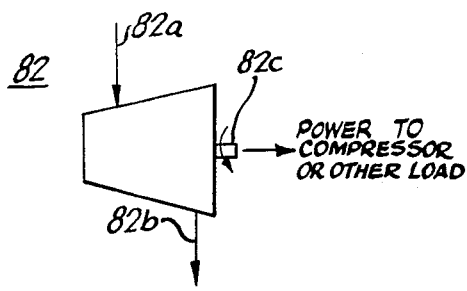
FIG. 2a shows a simplified block diagram showing power generating apparatus which may be substituted for the expansion valve or valves employed in the embodiments of FIGS. 2, 3 and 4.

The expansion valve 70 of FIG. 2 may be replaced by turbine or fluid motor 82 of FIG. 2a for receiving working fluid at inlet 82a and delivering working fluid through its outlet 82b to the inlet of evaporator 44. The fluid motor 82 thus produces power at its output shaft 82c which may be utilized for the heat pump compressor as well as providing input power to any load within the vicinity of the equipment. The substitution increases the system coefficient of performance (COP) due to the power extracted from the turbine 82.

Figure 5:
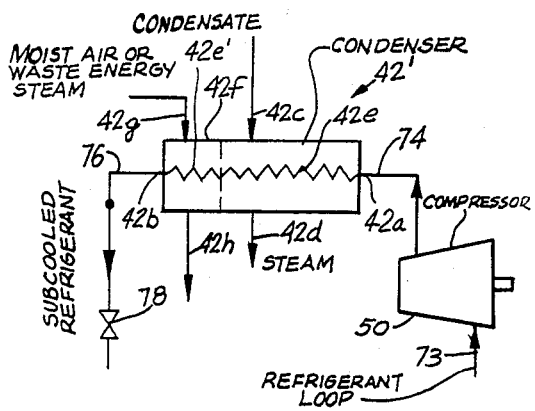
FIG. 5 shows a simplified block diagram of a condenser which may be utilized in any of the systems of FIGS. 2 through 4 for subcooling the working fluid (refrigerant) passing through the condenser.

The working fluid (refrigerant) leaving the condenser 42' of FIG. 2, for example, is typically near a saturated liquid state. By utilizing cooler, moist air present within the loop of the energy recovery cycle or other waste stream, it is possible to subcool the working fluid (refrigerant) leaving the condenser 42, thereby greatly increasing the coefficient of performance of the cycle since the work per pound of working fluid (refrigerant) for compression remains the same while the heat removed per pound in the condenser increases. The coefficient of performance is further enhanced since the number of pounds of working fluid is also reduced. Considering FIG. 5 in detail wherein like elements as between FIGS. 2 and 5 are designated by like numerals, compressor 50 compresses the working fluid (refrigerant) delivered thereto by conduit 73 and introduces the compressed working fluid into condenser 42 through conduit 74. The working fluid (refrigerant) entering at 42a transfers its energy through transfer surface 42e' to the condensate entering at 42c to produce steam appearing at outlet 42d. The condenser 42' is segmented so that a portion 42f thereof is separated from the remaining portion of the condenser 42' and is provided with inlet 42g which receives waste energy such as, for example, from the waste energy stream, or moist air entering at 42g, and which is adapted to absorb heat energy from the working fluid (refrigerant) through transfer surface portion 42e' and thereafter passing out of condenser 42' through outlet 42h. The working fluid (refrigerant) is thus subcooled just prior to leaving condenser 42' at 42b and entering into conduit 76, thereby greatly increasing the coefficient of performance since the work per pound provided by the working fluid (refrigerant) upon compression remains the same, whereas the heat removed per pound by the condenser increases. Thus the condenser arrangement 42' of FIG. 5 may be substituted for the condenser 42 of FIG. 2, yielding an increase in COP.

Figure 6:
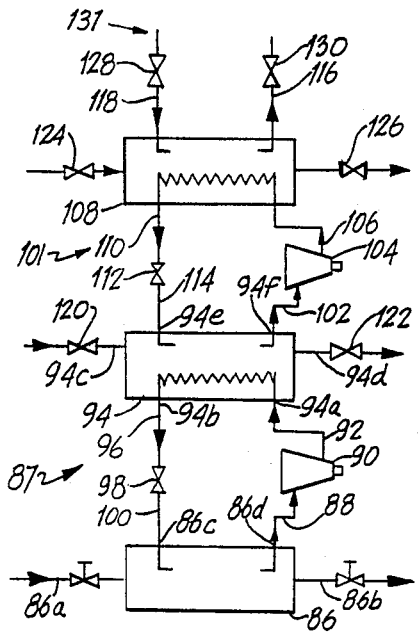
FIG. 6 shows a block diagram of a heat exchanger array and means for selectively introducing or removing the heat exchangers from the array in accordance with changes in input levels and/or output energy demands.

FIG. 6 shows an array of heat exchange units 86, 94, 108 connected to one another in a manner to be more fully described and which can be selectively introduced or removed from the array in accordance with variations in temperature levels in the system in order to optimize system performance at such levels.

Considering the arrangement of FIG. 6, evaporator 86 is included in the lowest pressure refrigeration loop 87 consisting of conduit 88, compressor 90, conduit 92, evaporator 94, conduit 96, expansion valve 98 and conduit 100, an appropriate working fluid (refrigerant) being circulated within the aforesaid closed loop 87. The temperature and pressure of the working fluid leaving evaporator 86 enters into compressor 90 and the energy generated thereby is transferred to another working fluid in heat exchanger 94. The condensed working fluid (refrigerant) leaving heat exchanger 94 through conduit 96 is then throttled through valve 98 before being returned to evaporator 86 which receives waste energy at input 86a. The energy is transferred to the working fluid (refrigerant) and thereafter the waste energy carrier such as, for example, steam, exits from evaporator 86 at 86b. The working fluid (refrigerant) enters evaporator 86 at 86c and leaves evaporator 86 at outlet 86d. The compressed working fluid passing through conduit 92 enters heat exchanger 94 at inlet 94a and leaves heat exchanger 94 at outlet 94b.

A second working fluid (refrigerant) loop 101 is comprised of heat exchanger 94, conduit 102, compressor 104, conduit 106, heat exchanger 108, conduit 110, throttle valve 112 and conduit 114. This closed loop 101 may contain a refrigerant which is preferably different from the refrigerant in the first-mentioned loop 87. The same series of processes set forth above with regard to loop 87 are performed within the second loop 101. The loops 87, 101 allow several refrigerants to be used in order to optimize performance at different temperature levels. Additional loops may be utilized. For example, heat exchanger 108 may in turn form part of a third closed loop 131 which, for purposes of simplicity, is shown only as including conduits 116 and 118 and valves 128, 130.

A particularly advantageous feature of the multiple stage arrangement of FIG. 6 is the heat exchange unit 94 which includes two independent working fluid (refrigerant) loop passages as well as inlets 94c and 94d for receiving a third working fluid. For example, loop 101 may be inactivated by turning off compressor 104 and closing valve 112. Valves 120 and 122 are then opened to permit condensate to be admitted through valve 120 into heat exchanger 94 which transfers energy from the fluid in loop 87 to the condensate entering at 94c. Heat exchanger 94 discharges steam at outlet 94d through valve 122. Valves 120 and 122 may be operated either manually or automatically. The above arrangement allows the generation of steam at a lower pressure by cutting out second loop 101 and/or at a higher pressure by re-establishing the second closed loop 101 by closing valves 120 and 122, opening valve 25, turning on turbine 104, opening valves 124 and 126 and closing valves 128 and 130. A third loop may be created by closing valves 124 and 126 and opening valves 128 and 130 and coupling conduits 116 and 118 into a third closed loop substantially identical to closed loops 87 and 101. The arrangement of FIG. 6 has a great deal of flexibility since steam can be generated at one or several different pressure levels either separately or simultaneously without any deleterious effect to the coefficient of performance. Thus, for example, loops 87 and 101 may both be completed and steam may be generated by heat exchangers 94 and 108 simply by opening the pairs of valves 120-122 and 124-126 to develop steam at two different pressures.

It should be further understood that a fluid other than condensate can be admitted through conduit 94c of heat exchanger 94. The flow through heat exchanger 108 operates in a fashion substantially similar to that of heat exchanger 94. Conduits 118 and 116 guide the flow of working fluid (refrigerant) in a third stage closed loop 131, if desired. It should further be noted that working fluid in the highest pressure loop can be water, in which case the condenser in that loop can be omitted, liquid can be fed into the condenser of the next lowest pressure loop and high pressure steam removed from the compressor exhaust. For example, condenser 108 in loop 101 can be eliminated, liquid may be introduced into inlet 94e of condenser 94 and high pressure steam may be derived from the exhaust of compressor 104.

Figure 7:
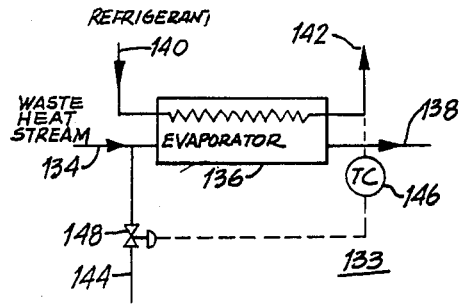
FIG. 7 shows a simplified block diagram of an evaporator for use in any of the systems shown in FIGS. 2 through 4 for regulating working fluid (i.e. refrigerant) flow in accordance with variations and/or interruptions in the waste energy delivered to the evaporator.

FIG. 7 shows an arrangement for compensating for variations in waste energy delivered to the recovery system. In the event that waste energy available at conduit 134 for delivery to evaporator 136 varies, the exit conditions at conduit 142 will vary. To remedy this problem, the arrangement 133 of FIG. 7 is provided with an auxiliary conduit 144 for receiving steam from a make-up source (not shown) such as a boiler. Temperature sensor 146 coupled to line 142 automatically regulates valve 148 to control the introduction of make-up steam in auxiliary line 144 to be admixed with the waste heat stream introduced through conduit 134 as a function of the degree of superheat of the working fluid (refrigerant) in conduit 142.

As was described hereinabove, the energy recovery system employed for recovering waste energy from a TMP system, for example, must be capable of continuous operation on a day-to-day basis. However, since the working fluid (refrigerant) is exposed to high temperature levels during system operation, the working fluid (refrigerant) may decompose or otherwise form products of reactions with the materials in contact with the working fluid.

Figure 8:
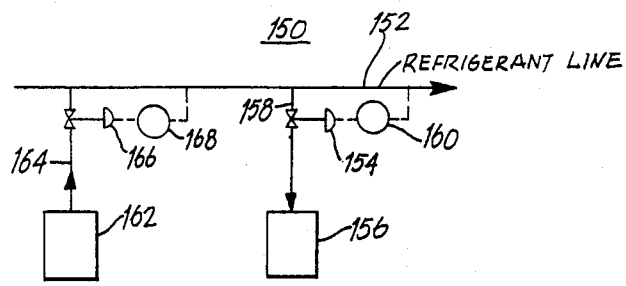
FIG. 8 shows a simplified block diagram of a blowdown system for use in either withdrawing and/or replenishing a working fluid utilized within the energy recovery system.

FIG. 8 shows a blow-down system 150 which may be either of a manual or automatic design, for use in withdrawing fluid from the working fluid (refrigerant) on either a continuous or intermittent basis. The arrangement of FIG. 8 shows a working fluid (refrigerant) line 152. A tank 156 is coupled to conduit 152 through line 158. Valve 154 may be opened periodically at intervals determined by past experience with the system so as to remove fluid from conduit 152, which is collected in tank 156. When valve 154 is closed, the contents of tank 156 may be disposed of.

The system may be operated on an automatic basis by providing monitor 160 which automatically opens valve 154 based upon the presence of a measured rate of decomposition product of the working fluid being used.

Working fluid may also be added to the line 152 by means of a storage tank 162 coupled to conduit 152 through conduit 164. Valve 166 may be opened to introduce additional working fluid into conduit 152. Additional working fluid may be added in an automatic fashion through the employment of monitor means 168 on sensing the presence of a predetermined condition, such as, for example, the amount of working fluid which has been withdrawn and diverted into tank 156. As an alternative, valve means 166 may be coupled to monitor 160.

Figure 3:
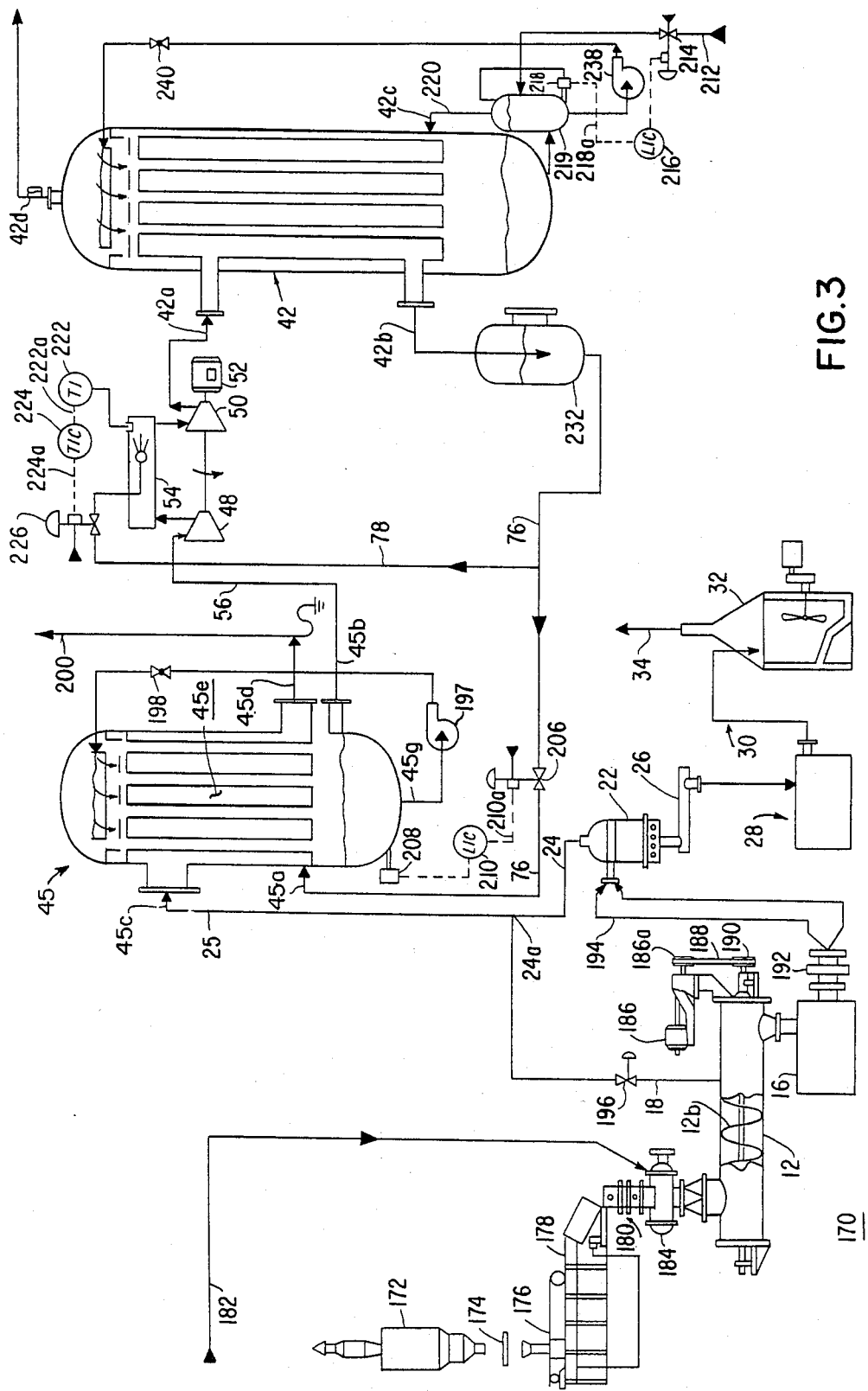
FIG. 3 shows a detailed block diagram of a TMP system of the type shown in FIG. 1 but employing only a single condenser.

FIG. 3 shows an alternative waste recovery system 170 which constitutes the aforementioned modification of the system of FIG. 2 in which only a single evaporator is employed. Wherever appropriate, like elements have been designated by like numerals.

Chip cyclone 172 receives chips being blown from storage which pass through metering device 174 for deposit on to conveyor 176 and ultimate introduction into washer-drainer 178. The moistened chips are then delivered to feed screw 180. The chips are admixed with processed steam introduced by conduit 182 into rotary feed valve 184, at which location the chips and processed steam are admixed. The chips enter into steaming tube 12 and are conveyed therealong by screw feeder 12b driven by motor 186 whose drive pulley 186a is coupled to screw feeder pulley 190 by closed loop belt 188. The first stage refiner 16 defiberizes the wood chips in the manner previously described. The defiberized material passes through blow valves 192 and conduit 194 to enter into blow cyclone 22 operating in the manner previously described. Screw conveyor 26 delivers the defiberized material to a secondary non-pressurized refiner stage 28. The defiberized material then passes through conduit 30 and enters into latency chest 32. The steam introduced into steaming tube 12, which is also present in the first stage refiner 16, conduit 194 and blow cyclone 22, is vented through conduits 18 and 24 in the same manner as was previously described. Valve 196 may be closed or opened to any desired valve control position to regulate the pressure levels of the steam within steaming tube 12 and blow cyclone 22. The waste steam passes through vent 25 and enters into inlet 45c of evaporator 45. The waste steam passes over heat transfer members 45e in evaporator 45 which may be a falling film evaporator, in which working fluid (refrigerant) in the lower portion of the evaporator 45 passes through outlet 45g and is delivered by pump 197 to the upper end of evaporator 45 where the working fluid (refrigerant) is caused to flow over the heat transfer surfaces of members 45e. Valve 198 is utilized to regulate the flow rate at which the working fluid is circulated. The waste steam exits from evaporator 45 at outlet 45d where it is vented to the atmosphere through vent 200.

The closed loop working fluid (refrigerant) conduit 76 enters evaporator 45 at inlet 45a and exits at outlet opening 45b. Throttle valve 206 regulates the flow rate of refrigerant entering evaporator 45. A level transmitter 208 monitors the working fluid (refrigerant) level in evaporator 45 and provides a signal to level instrument control 210 which provides a visually observable reading of the working fluid level and automatically controls throttle valve 206 through line 219a to regulate flow rate therethrough.

The working fluid (refrigerant) in the vapor phase exits through conduit 56 and enters into the first stage compressor 48. The compressed refrigerant then enters into desuperheater 54 to be desuperheated and undergoes a second stage of compression by compressor 50. The output of the second compressor stage 50 enters into inlet 42a of condensor 42 which may also be of the falling film type. The working fluid transfers its heat energy to feed water introduced through line 212, valve 214, tank 219 and inlet 42c. The working fluid transfers its energy to the feed water to generate steam at outlet 42d. The working fluid passes from outlet 42b of condenser 42 into working fluid surge tank 232 where it is delivered through conduit 76 simultaneously to evaporator 44 and to desuperheater 54. The flow rate of working fluid through conduit 78 is controlled by temperature indicator 222 whose output 222a is coupled to temperature indicating controller 224 having outlet 224a for adjustment of throttle valve 226.

Tank 219 serves as an intermediate storage tank from which feed water is circulated through condenser 42 by pump 238, the flow rate being regulated by control valve 240. The working fluid derived from condenser 42 thus serves the dual functions of supplying working fluid for evaporator 44 which transfers waste energy thereto, as well as providing working fluid for desuperheating the superheated working fluid compressed by first compressor stage 48.

Figure 4:
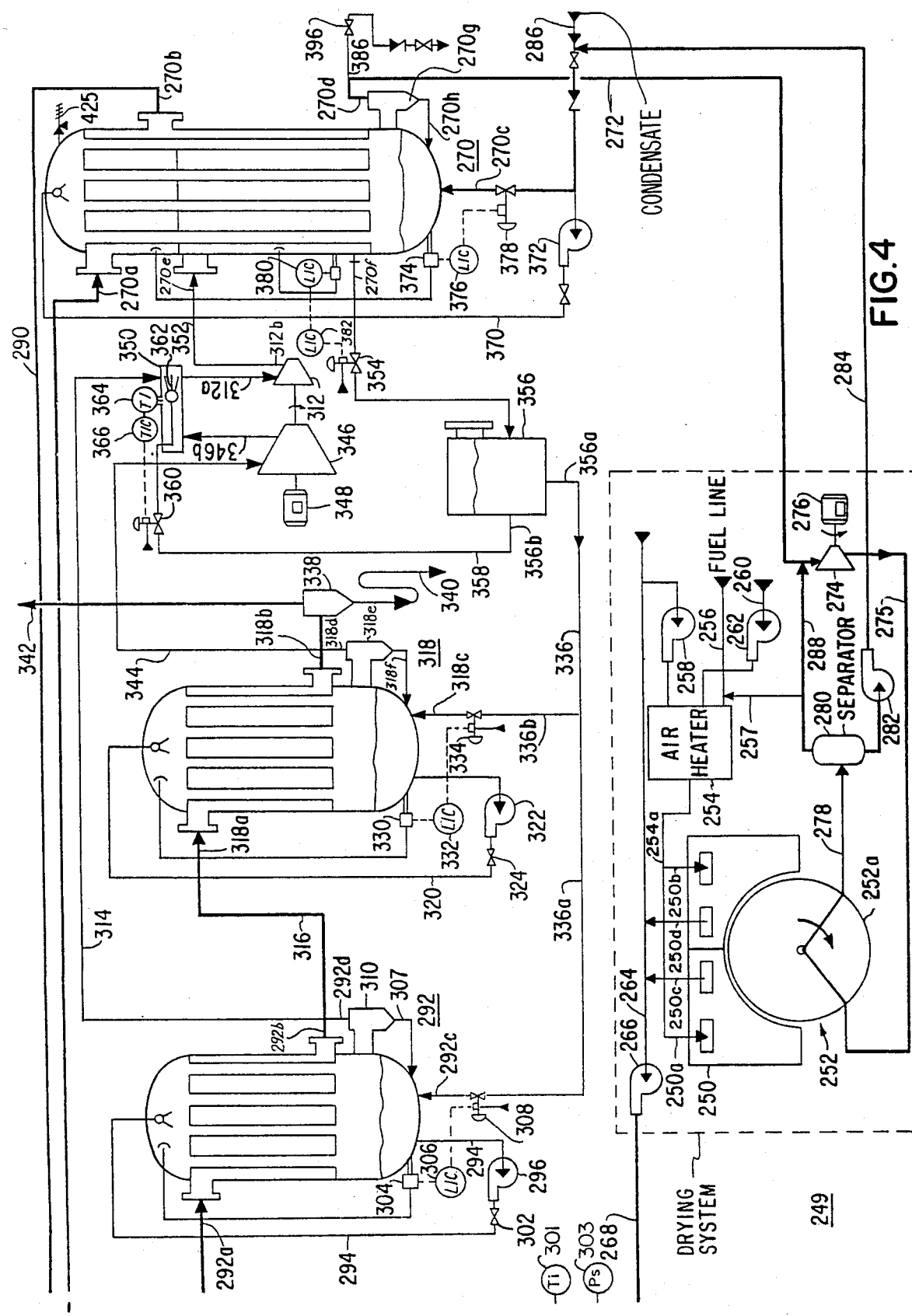
FIG. 4 shows a detailed block diagram of a waste energy recovery system employing the principles of the present invention and used in combination with a hot air dryer system.

FIG. 4 shows still another alternative embodiment 250 of the present invention in which the waste energy recovery techniques described hereinabove are utilized in a dryer system 249 comprised of a very large diameter rotating drum 252. A web to be dried (not shown) is passed about the surface of drum 252 which is heated to dry the web. A hood 250 is arranged above the upper half of drum 252 and, although not shown in detail, contains nozzles for delivering air toward the surface of drum 252, as well as for removing air for delivery to the exhaust line. An air heater 254, supplied with fuel through line 256, receives air delivered by fan 258 as well as combustion air through line 260, delivered to heater 254 by blower 262. Fuel oil in line 256 is atomized by steam diverted from a steam line to be more fully described through conduit 257. If natural gas is used, atomization is not necessary. Heater 254 heats the air up to temperatures of the order of 900° F. through direct combustion and delivers the heated air through conduit 254a into the inlets 250a and 250b of hood 250. Air exits from hood 250 through outlets 250c and 250d at a temperature of the order of 750° F. and passes through conduit 264 to exhaust fan 266 which delivers the high temperature air through conduit 268 to inlet 270a of steam generator 270. The capacity of exhaust fan 266 is substantially equal to the capacity of combustion blower 262 in order to assure balance within the system. Temperature and pressure indicators may be used to monitor the air in conduit 268.

The steam generated by steam generator 270 exits at outlet 270d and enters conduit 272 where it is introduced into the inlet of steam compressor 274, driven by motor 276. The output of steam compressor 274 is introduced directly into rotary drum 252 to heat the drum surface 252a for drying the web passing about drum surface 252a. A combination of steam and water is emitted from drum 252 and enters conduit 278 where it is introduced into separator 280 which separates the steam and water, delivers the water from pump 282 through conduit 284 to the condensate inlet 286. The steam exiting from separator 280 is introduced through conduit 288 into steam compressor 274. As was previously mentioned, a portion of the steam outputted from separator 280 is diverted through conduit 257 to atomize fuel oil passing through fuel delivery line 256.

As was mentioned hereinabove, the extremely high temperature air is utilized to convert condensate into steam. The air does not give up all of its heat energy and the system takes advantage of this by coupling air outlet 270b through conduit 290 into inlet 292a of high temperature evaporator 292. Evaporator 292 is preferably of the falling film evaporator type mentioned previously. Working fluid collected near the bottom of evaporator 292 passes through conduit 294 and is delivered by pump 296 to the upper end of evaporator 292 for continuous circulation thereof. In one preferred embodiment, the rate of flow may, for example, be of the order of 400 gallons per hour. Temperature and pressure indicators may be provided for monitoring working fluid within the circulation line 294. Circulation may be regulated and/or terminated by operation of pump 296 and valve 302.

Working fluid level within evaporator 292 is measured by level detector 304. The level detector 304 is coupled to level indicating controller (TIC) 306 which utilizes the level condition to control level valve 308 for regulating the introduction of working fluid into evaporator inlet 292c.

Working fluid introduced into evaporator 292 exits through separator 310 and outlet opening 292d, entering into the input of second stage vapor compressor 312 through conduit 314. Working fluid in the liquid phase reenters evaporator 292 through line 307.

The hot air, which still contains a significant level of heat energy, then passes through outlet 292b and conduit 316 into the inlet opening 318a of low temperature evaporator 318. Low temperature evaporator 318 is substantially similar in design to high temperature evaporator 292 in that it is of the falling film type and is provided with a circulation conduit 320 for circulating working fluid (refrigerant) by way of pump 322. Level detecting device 330 measures the level of working fluid (refrigerant) within evaporator 318. Level indicating controller 332 monitors the refrigerant level to control the operation of level valve 334, thereby controlling the flow rate of refrigerant introduced into evaporator 318 at inlet 318c.

The hot air introduced through inlet 318a of evaporator 318 transfers its heat energy to the aforementioned working fluid (refrigerant) and exits through outlet opening 318b. Separator 338 causes condensate to pass through line 340 while allowing air to exit through vent 342. The working fluid (refrigerant) which has absorbed heat energy from the hot air passes through separator 318e. Any working fluid (refrigerant) in the liquid phase is returned to evaporator 318 through line 318f. The working fluid (refrigerant) in the vapor phase passes through conduit 344 where it enters into the first stage compressor 346. Compressors 312 and 346 are shown as being driven in common by motor 348. However, the compressors 312, 346 may also be driven by separate motors, if desired. The working fluid introduced into compressor 346 leaves outlet 346b and enters into desuperheater 350. The desuperheated working fluid exits from desuperheater 350 where it enters inlet 312a of second stage vapor compressor 312 whose output 312b passes through conduit 352 into inlet 270e of steam generator 270.

Steam generator 270 is unique in that the steam generator is divided into two segments, the first of said segments, namely the upper half thereof, being utilized to generate steam by hot air, while the lower segment is utilized to generate steam through the use of a working fluid.

The generator 270 may be replaced by two separate heat exchange units, if desired.

The working fluid transfers its heat energy to the condensate to generate steam. The condensed working fluid leaves the steam generator 270 at outlet 270f and passes through valve 354 where it enters into surge tank 356 one outlet of which, 356a, is coupled to line 336 and the other outlet of which, 356b, is coupled through conduit 358 and valve 360 to the control member 362 of desuperheater 350. Temperature indicator (TI) 364 measures the temperature level in desuperheater 350. The output signal is coupled to temperature indicating controller (TIC) 366 which operates valve 360 to regulate the flow rate of refrigerant in the liquid phase into desuperheater 350.

As was mentioned hereinabove, steam generator 270 is preferably of the falling film type. Condensate entering into the circulation line 370 is circulated from the bottom of steam generator 270 to the top thereof by pump 372. The level of condensate introduced into steam generator 270 is monitored by level transmitter 374 whose output is coupled to level indicating controller 376 which operates valve 378. In a similar fashion, level transmitter 380 monitors the level of working fluid (refrigerant) within steam generator 270. Its output is monitored by level indicating controller 382 which controls valve 354, regulating the rate of flow of working fluid leaving steam generator 270.

As was mentioned hereinabove, the steam generated by steam generator 270 and available at outlet 270d, first passes through separator 270g which separates the steam from the condensate, returning condensate through line 270h to steam generator 270. Steam is delivered through line 272 to steam compressor 274 which compresses the steam and thereafter introduces the compressed steam into drying drum 252 through conduit 275.

The generated steam may also be provided to other utilization devices through line 386.

Figure 4A:
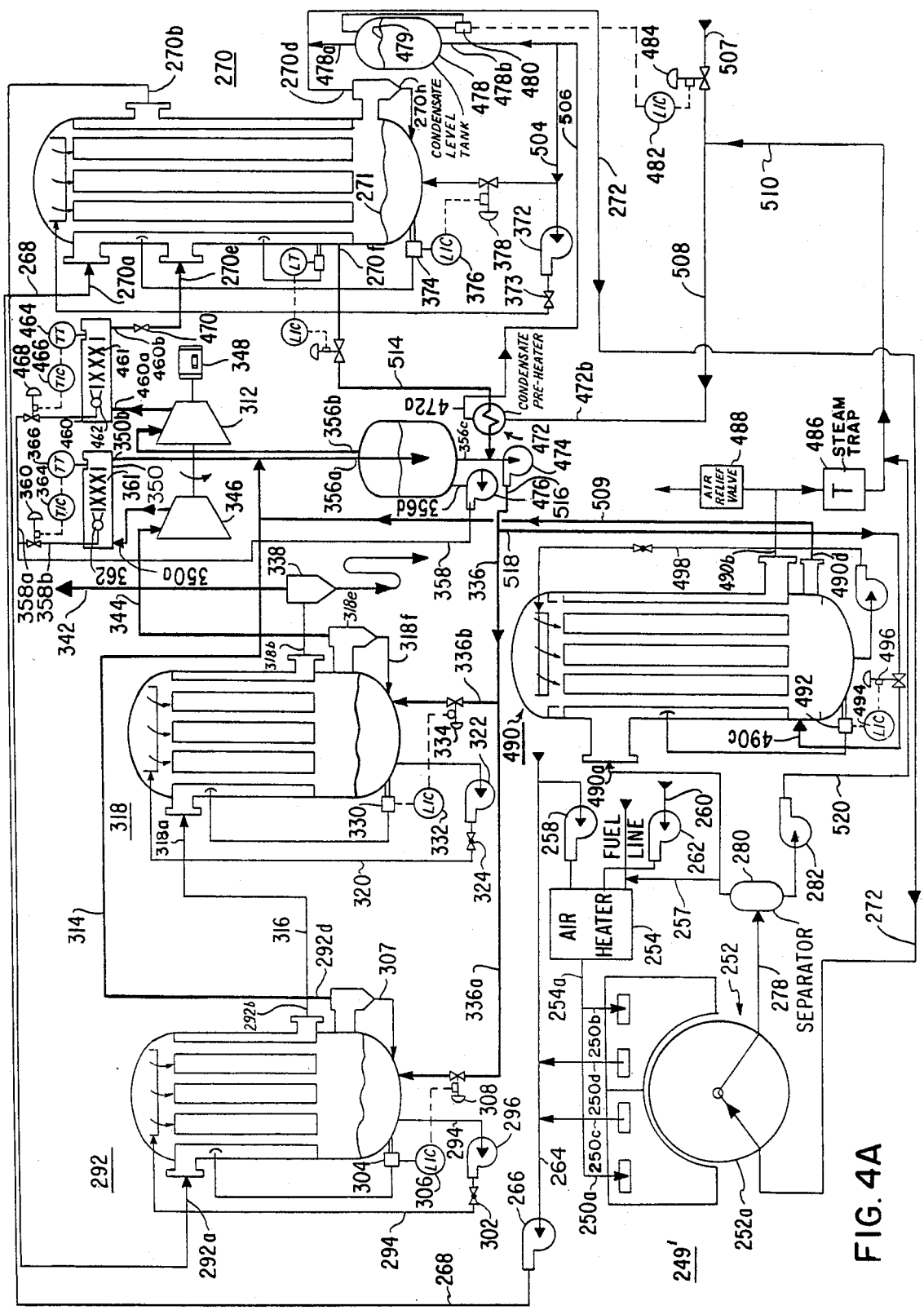
FIG. 4a shows a detailed block diagram of an alternative embodiment for the waste energy recovery system shown in FIG. 4.

FIG. 4A shows an alternative arrangement 249' for the waste energy recovery system 249 of FIG. 4 in which an evaporator 490 is substituted for the compressor 274 and prime mover 276, shown in FIG. 4, as will be more fully described. Like elements have been designated by like numerals as between FIGS. 4 and 4A and detailed descriptions of operation of such elements will be omitted hereinbelow for purposes of simplicity.

The hot air from unit 250 enters line 264 and is urged along conduit 268 by blower 266. The hot air transfers its heat energy to the condensate entering steam generator 270.

The hot air, which still contains a significant amount of heat energy, sequentially enters high temperature evaporator 292 and low temperature evaporator 318. Thereafter the air is vented to the atmosphere at vent 342.

The working fluid (refrigerant) leaving evaporator 292 through conduit 314 merges with working fluid in conduit 509 derived from blow-through steam evaporator 490. These two flows are the merged with desuperheated working fluid from the outlet 350b of desuperheater 350 and the three merged fluid flows enter inlet 356a of surge tank 356. Working fluid in surge tank 356 which is in the vapor phase leaves through outlet 356b and enters compressor 312. Working fluid in the liquid phase leaves surge tank 356 at outlet 356c and merges with working fluid in line 514. The merged fluid flows are pumped into conduits 336 and 518 by pump 474. Some of the working fluid in the liquid phase leaves surge tank 356 at outlet 356d and is pumped into conduit 358 by desuperheater pump 476. The working fluid in conduit 358 divides into branches 358a and 358b to be passed through the superheated working fluid entering desuperheaters 350 and 460 by means of control heads 362 and 462, respectively. Mixers 351 and 461, in the form of rotating vanes, provide intimate mixing of the working fluid in the superheated vapor phase with the liquid phase working fluid.

As was set forth above, the desuperheated working fluid leaving desuperheater 350 enters surge tank 356. The working fluid in the vapor phase leaves surge tank 356 through outlet 356b. All of the excess working fluid in the liquid phase is directly returned to the evaporators 292 and 318 through outlet 356c, except for the small portion thereof utilized for desuperheating delivered from outlet 356d.

The compressor 312 receiving the working fluid from surge tank 356, further compresses the working fluid and passes the superheated working fluid to desuperheater 460. The desuperheated working fluid then passes through adjustable valve 470 to reduce the pressure of the working fluid before it enters the lower portion of steam generator 270 through inlet 270e.

The working fluid, after transferring its heat energy to the condensate in steam generator 270, enters into condensate preheater 472 to pre-heat the condensate passing therethrough and before the condensate enters steam generators 270 and 490 through conduits 508 and 510, respectively. The working fluid leaves pre-heater 472 and merges with the working fluid in the liquid phase leaving surge tank 356. The transfer of heat energy from the working fluid leaving steam generator 270 lowers the enthalpy of the working fluid and thereby allows the working fluid to pick up more heat energy in evaporators 290 and 318, significantly reducing the amount of working fluid needed, thereby reducing the size and capacity of evaporators 292 and 318.

Condensate tank 478 and steam generator 270 derive preheated condensate from conduit 506. Separator 270h returns condensate to the bottom of steam generator 270. Condensate make-up is derived at inlet conduit 507 depending upon the level of condensate in tank 478, which is monitored by level sensor 480 and controller 482, serving to operate valve 484 in accordance with the level in tank 478. The level 479 in tank 478 reflects the level 271 in tank 270.

Condensate from separator 280 through pump 282, and from evaporator 490 through steam trap 486 is delivered to condensate preheater 472 through conduit means 520, 510, 508 and 472b.

The steam developed by steam generator 270 is transferred directly to drum 252 through conduit 272.

The steam and condensate leaving drum 252 through conduit 278 enters separator 280. The steam separated out is delivered to inlet 490a of steam evaporator 490. The steam entering blow-down steam evaporator 490 transfers its heat energy to the working fluid delivered thereto through conduit 518. The heated working fluid leaves steam generator 490 at outlet 490d and passes through conduit 509 which merges with conduit 314 to deliver working fluid to surge tank 356.

The embodiment of FIG. 4 provides a recovery system in which both hot air and refrigerant are utilized to generate steam. The initial temperature level of the hot air as it leaves hood 250 is sufficient to generate steam directly. The hot air is then introduced additional heat exchanger (evaporator) units to transfer still further heat energy to a working fluid (refrigerant). The greater heat energy level is transferred to the working fluid (refrigerant) passing through high temperature evaporator 292, while the lesser level of heat energy is delivered to the working fluid passing through low temperature evaporator 318. As a result, the working fluid emitted from evaporator 318 undergoes two stages of compression, as well as an intermediate stage of desuperheating, while the working fluid leaving high temperature evaporator 292 undergoes only a single stage of compression. The working fluid delivered from low temperature evaporator 318 and leaving compressor 346, however, is combined with the working fluid delivered from high temperature evaporator 292 in the second stage vapor compressor 312, the combined streams of working fluid being introduced to that portion of the steam generator utilizing the working fluid to generate steam.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method for waste energy recovery comprising the steps of:
   providing a common heat transfer surface;
   moving a first fluid containing waste energy along a first portion of said surface;
   providing heat energy in a second fluid;
   thereafter moving said second fluid along a second portion of said surface while retaining the first and second fluids totally isolated from one another;
   providing a third fluid for receiving heat energy;
   moving said third fluid along said heat transfer surface adjacent the first and second portions thereof while maintaining said third fluid totally isolated from said first and second fluids whereby energy from said first and second fluids are transferred to said third fluid, said first, second and third fluids being hot air, a refrigerant and water reintroducing energy into the second fluid after its energy is transferred to the third fluid.

2. A method for recovering waste energy from a heated fluid comprising the steps of:
   a. transferring energy from the heated fluid containing waste energy to a first working fluid;
   b. transferring energy remaining in the heated fluid to a second working fluid;
   c. thereafter compressing the second working fluid;
   d. desuperheating the compressed second working fluid;
   e. transferring the heat energy of the desuperheated compressed second working fluid to the first working fluid;
   f. returning the second working fluid to the influence of said heated fluid to again receive energy from said heated fluid.

3. The method of claim 2 further comprising the steps of:
   g. separating the desuperheated second working fluid into liquid and vapor phases;
   h. using the second working fluid in the vapor phase to perform step e; and
   i. using the second working fluid in the liquid phase to perform step d.

4. The method of claim 2 wherein step e further comprises the step of:
   transferring the energy of the second working fluid to the first working fluid to preheat the first working fluid before the first working fluid receives energy from the heated fluid and the second working fluid, said second working fluid thereby being cooled to increase the amount of energy subsequently transferred to the second working fluid by said heated fluid.

5. Apparatus for recovery of waste energy comprising:
   heat exchanger means comprising first, second and third receiving means, said first means receiving a first working fluid;
   said second and third fluid receiving means respectively receiving second and third working fluids;
   said first, second and third fluids being different from one another, said first fluid containing said waste energy means for introducing energy into the second fluid;
   said heat exchanger means further including transfer means engaged by said first, second and third fluids for isolating said fluids from one another and including means for transferring energy from the fluids in said first and second fluid receiving means to the third fluid passing through said third fluid receiving means to increase the energy of said third fluid above the energy of the third fluid prior to its entry into said third fluid receiving means;
   said second fluid being returned to the energy introducing means after leaving said heat exchanger means.

6. The apparatus of claim 5 further comprising means for delivering hot air to said first fluid receiving means;
   means for delivering a refrigerant to said second fluid receiving means; and
   means for delivering water to said third fluid receiving means.

7. Apparatus for recovering waste energy from a heated fluid comprising:
   a first loop for circulating a first working fluid;
   heat exchanger means in said first loop for transferring energy from said working fluid to a second working fluid;
   first evaporator means in said first loop and receiving said heated fluid and said first working fluid for transferring energy from said heated fluid to said first working fluid;
   first compressor means, desuperheating means and second compressor means in said first loop for respectively compressing and desuperheating and thereafter compressing said first working fluid prior to introduction of the first working fluid into said heat exchanger means; and
   said heat exchanger means further including means for transferring energy from said heated fluid to said second working fluid.

8. The apparatus of claim 7 further comprising means in said loop for transferring energy from said second working fluid, as the second working fluid leaves said heat exchange means, to said first working fluid prior to the first working fluid entering said heat exchange means.

* * * * *

UNITED STATES PATENT AND TRADEMARK OFFICE
CERTIFICATE OF CORRECTION

PATENT NO. : 4,522,035

DATED : June 11, 1985

INVENTOR(S) : David Dyer and James L. Wise

It is certified that error appears in the above-identified patent and that said Letters Patent is hereby corrected as shown below:

Column 10, line 48 change "219a" to --210a--.

Signed and Sealed this

Third Day of December 1985

[SEAL]

Attest:

Attesting Officer

DONALD J. QUIGG

Commissioner of Patents and Trademarks